US011416496B2

(12) United States Patent
Mylnikov et al.

(10) Patent No.: US 11,416,496 B2
(45) Date of Patent: Aug. 16, 2022

(54) COMPUTER IMPLEMENTED METHOD FOR CONTINUOUS PROCESSING OF DATA-IN-MOTION STREAMS RESIDING IN DISTRIBUTED DATA SOURCES

(71) Applicant: Hitachi Vantara LLC, Santa Clara, CA (US)

(72) Inventors: Alex Mylnikov, Edison, NJ (US); Rohit Mahajan, Iselin, NJ (US)

(73) Assignee: HITACHI VANTARA LLC, Santa Clara, CA (US)

( * ) Notice: Subject to any disclaimer, the term of this patent is extended or adjusted under 35 U.S.C. 154(b) by 223 days.

(21) Appl. No.: 16/577,522

(22) Filed: Sep. 20, 2019

(65) Prior Publication Data

US 2020/0278973 A1 Sep. 3, 2020

Related U.S. Application Data

(60) Provisional application No. 62/812,573, filed on Mar. 1, 2019.

(51) Int. Cl.
*G06F 16/2455* (2019.01)
*G06F 16/27* (2019.01)
*G06F 16/901* (2019.01)
*G06F 16/22* (2019.01)

(52) U.S. Cl.
CPC ...... *G06F 16/24568* (2019.01); *G06F 16/221* (2019.01); *G06F 16/2255* (2019.01); *G06F 16/2282* (2019.01); *G06F 16/27* (2019.01); *G06F 16/9024* (2019.01)

(58) Field of Classification Search
CPC ............. G06F 16/24568; G06F 16/221; G06F 16/2255; G06F 16/2282; G06F 16/27; G06F 16/9024

USPC ......................................................... 707/769
See application file for complete search history.

(56) References Cited

U.S. PATENT DOCUMENTS

| 10,936,585 B1 * | 3/2021 | Echeverria ............... G06N 5/00 |
| 2007/0234005 A1 | 10/2007 | Erlingsson et al. |
| 2008/0065630 A1 | 3/2008 | Luo et al. |
| 2008/0162485 A1 | 7/2008 | Long et al. |
| 2009/0171999 A1 | 7/2009 | McColl et al. |
| 2014/0108474 A1 | 4/2014 | David et al. |
| 2014/0250487 A1 | 9/2014 | Gu et al. |

(Continued)

FOREIGN PATENT DOCUMENTS

KR        101770937 B1    8/2017

OTHER PUBLICATIONS

Apache Spark, MapR, "Spark," © 2019 MapR Technologies, Inc., Sep. 12, 2019, url: https://mapr.com/products/product-overview/apache-spark/.

(Continued)

*Primary Examiner* — Michael Pham
(74) *Attorney, Agent, or Firm* — Mattingly & Malur, PC

(57) ABSTRACT

A system and method for continuous processing of data streams residing in distributed data sources. The method includes: receiving a plurality of data streams from a plurality of distributed data sources; processing each of the plurality of data streams using a plurality commands, the plurality commands are executed in parallel using a graph execution engine; and transporting, through a transport layer, each of the plurality of data streams using the plurality commands to at least one data sink.

15 Claims, 7 Drawing Sheets

(56) References Cited

U.S. PATENT DOCUMENTS

| | | |
|---|---|---|
| 2015/0039852 A1 | 2/2015 | Sen et al. |
| 2015/0235833 A1 | 8/2015 | Bazargan et al. |
| 2016/0006779 A1* | 1/2016 | Zhou .................. G06F 11/1438 |
| | | 709/231 |
| 2016/0028629 A1 | 1/2016 | Carpentier et al. |
| 2016/0085810 A1 | 3/2016 | Alves et al. |
| 2016/0117323 A1 | 4/2016 | Sen et al. |
| 2018/0082082 A1 | 3/2018 | Lowenberg et al. |
| 2018/0089188 A1 | 3/2018 | Kharisma et al. |
| 2018/0089290 A1 | 3/2018 | Haggie et al. |
| 2018/0322179 A1 | 11/2018 | Kalinin et al. |
| 2018/0349421 A1 | 12/2018 | Sitsky et al. |
| 2019/0026307 A1 | 1/2019 | Davis et al. |
| 2019/0235917 A1* | 8/2019 | Koneru ................. G06F 9/4843 |
| 2020/0311304 A1 | 10/2020 | Parthasarathy |

OTHER PUBLICATIONS

Kraska, et al., "The Case for Learned Index Structures," Apr. 2018, pp. 1-30, url: https://arxiv.org/pdf/1712.01208.pdf.

Patil, "Hive Bucketing in Apache Spark," Databricks, Sep. 20, 2019, url: https://databricks.com/session/hive-bucketing-in-apache-spark.

The International Search Report and the Written Opinion of the International Searching Authority for PCT/US2020/014762, dated May 14, 2020, ISA/RU, Moscow, Russia.

The International Search Report and the Written Opinion of the International Searching Authority for PCT/US2020/019653, dated May 28, 2020, ISA/RU, Moscow, Russia.

* cited by examiner

COMPUTER IMPLEMENTED METHOD FOR CONTINUOUS PROCESSING OF DATA-IN-MOTION STREAMS RESIDING IN DISTRIBUTED DATA SOURCES

CROSS-REFERENCE TO RELATED APPLICATIONS

This application claims the benefit of U.S. Provisional Application No. 62/812,573 filed on Mar. 1, 2019, the contents of which are hereby incorporated by reference.

TECHNICAL FIELD

The present disclosure relates generally to processing of data in motion, and more particularly to tagging data in motion.

BACKGROUND

Applications and products for gaining insights from big data have become popular. Such applications and products are used to collect, manage, and analyze data for predictive purposes or retrieve real-time insight. Different types of data may require different computing platforms to provide meaningful insights. Insights can be extracted from data at rest or data in motion. Data at rest refers to data that has been collected from various sources and is then analyzed after the event occurs. The point at which the data is analyzed and the point at which action is taken on the data occur at two separate times. In contrast, the analysis of data in motion occurs in real-time as the event happens.

Any processing of data in motion should be performed in real-time. Therefore, latency is a key factor when implementing a solution for processing data in motion. Other constraints are that data in motion can be collected from different data sources, each source having its own format or structure. Further, the data from multiple different sources should be processed simultaneously and in real time. Due to such constraints, there are currently no solutions capable of processing large amounts of data in motion collected from different sources. Specifically, there are no solutions that can index or otherwise tag data in motion in real time.

It would, therefore, be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for continuous processing of data streams residing in distributed data sources. The method comprises the steps of receiving a plurality of data streams from a plurality of distributed data sources; processing each of the plurality of data streams using a plurality of commands, the plurality of commands being executed in parallel using a graph execution engine; and transporting, through a transport layer, each of the plurality of data streams using the plurality commands to at least one data sink.

In addition, certain embodiments disclosed herein include a system for continuous processing of data streams residing in distributed data sources. The system comprises a processing circuitry; and a memory, the memory containing instructions that, when executed by the processing circuitry, configure the system to: receive a plurality of data streams from a plurality of distributed data sources; process each of the plurality of data streams using a plurality commands, the plurality commands are executed in parallel using a graph execution engine; and transport, through a transport layer, each of the plurality of data streams using the plurality commands to at least one data sink.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
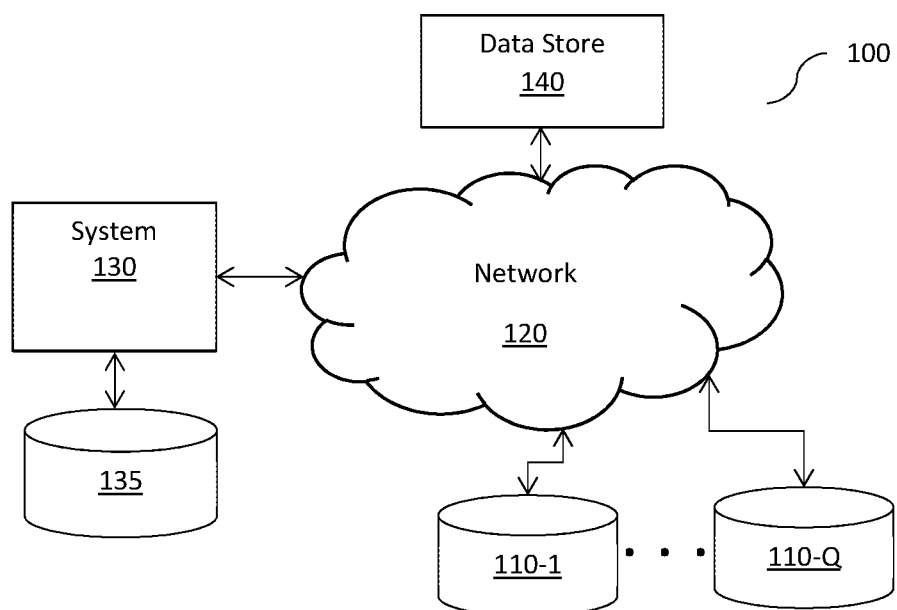
FIG. 1 is a network diagram utilized to describe various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram 100 utilized to describe the various embodiments. The diagram 100 depicts a plurality of data sources 110-1 through 110-Q (hereinafter referred to individually as a data source 110 and collectively as data sources 110 for simplicity), a system 130, and to a data store 140 communicating over a network 120. The network 120 may be, but is not limited to, a wireless, cellular or wired network, a local area network (LAN), a wide area network (WAN), a metro area network (MAN), the Internet, the world wide web (WWW), similar networks, and any combination thereof.

In an example embodiment, each data source 110 may be, but is not limited to, a data lake, a data warehouse, a streaming data, a dataset, a database, and the like. The database may be a relational database or a NoSQL type of database such as, but not limited to, MongoDB. Examples of relational databases may include, but are not limited to, Oracle®, Sybase®, Microsoft SQL Server®, Access®, Ingres®, and the like. In an embodiment, the data sources 110 may be logical entities residing in the same physical structure. The data stored in each data source 110 may be in a format of structured data, unstructured data, semi structured data, or a combination thereof.

The processing, including but not limited to tagging, is of data in motion, i.e., by a real-time process as data is saved in any of the data sources 110 or as data is transferred from one of the data sources 110 to one or more other data sources 110.

The system 130 is configured to perform various embodiments disclosed herein. Specifically, the system 130 is configured to implement processes for tagging data in motion. As noted above, all data in motion should be processed in real time. In an embodiment, to allow the tagging, the system 130 may be connected to a knowledge repository 135. The knowledge repository 135 maintains dictionaries utilized for the tagging of data in the data sources 110. For example, the knowledge repository 135 may include a dictionary for tagging sensitive information. The knowledge repository 135 may be a distributed database. Sensitive information is any information that is protected against unwarranted disclosure. Organizations are now required to safeguard access to personal or sensitive information. Protection of sensitive information may be required for legal or ethical reasons, for issues pertaining to personal privacy, or for proprietary considerations.

The system 130 may be utilized to quickly search content saved in any of the data sources 110. To this end, the system 130 is configured to generate a flexible structure to support differently structured metadata that represents different types of data stored in different data sources 110. The metadata references original data stored in any of the data sources 110. In yet another embodiment, the system 130 is configured to support parallel processing of metadata and, more specifically, parallel matching of metadata of different data sources.

As will be discussed in detail below, the system 130 is configured to implement a process for content addressable hash buckets (hereinafter "hash bucketing"). Actions can be performed in real-time on the hashed data using a set of predefined commands.

Figure 7:
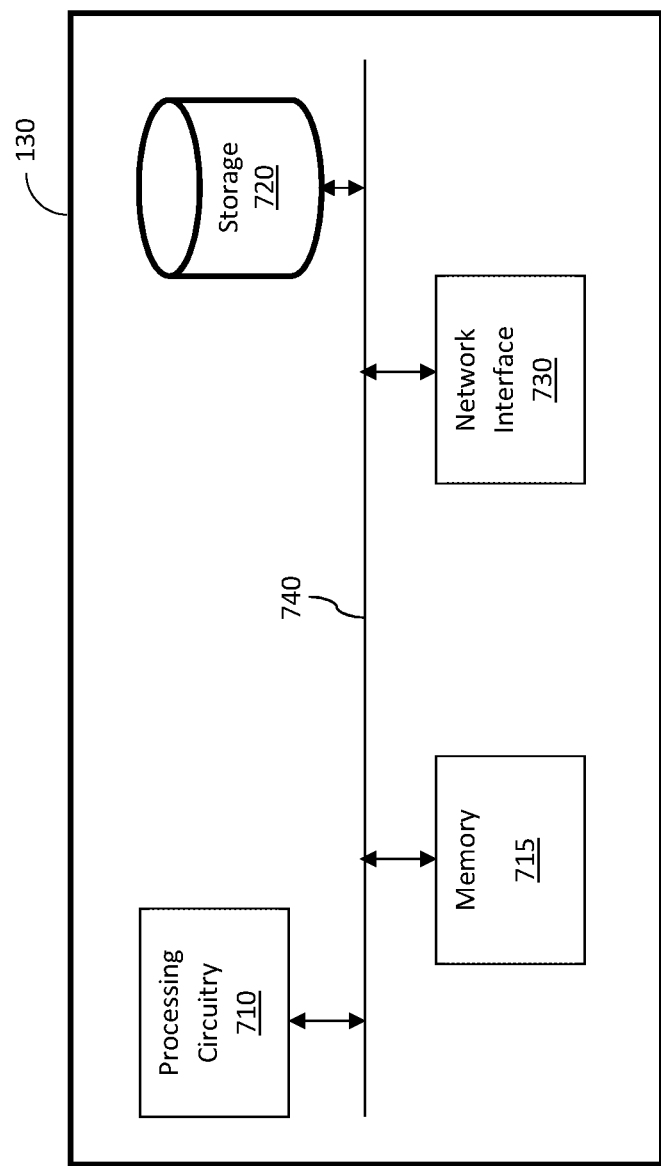
FIG. 7 is a block diagram of a system configured to execute the disclosed embodiments.

The system 130 may be implemented as a physical machine, a virtual machine, or a combination thereof. A block diagram of an example shown in FIG. 7 showing a physical machine implementation is discussed below. A virtual machine may be any virtual software entity, such as a software container, a micro service, a hypervisor, and the like.

It should be noted that the embodiments disclosed herein are not limited to the specific architecture illustrated in FIG. 1, and that other architectures may be equally used without departing from the scope of the disclosed embodiments. Specifically, the system 130 may reside in a cloud computing platform, a datacenter, and the like. The cloud computing platform may be a private cloud, a public cloud, a hybrid cloud, and the like. Moreover, in an embodiment, there may be a plurality of systems operating as a distributed system. Further, the data store 140 may be distributed as well. In some implementations, the system 130 may be an internal component or instance of any of the data sources 110.

According to some embodiments, a hash bucketing process based on modified content addressable storage (CAS) process is disclosed. The process is performed by the system 130 and includes mapping any piece of information saved in a data source 110 to a bucket as well as to a specific location (record) within the bucket. The mapping is performed using a hash function. That is, the mapping can be represented as follows:

Data_Address=H(dataset);

where H is a hash function, the 'dataset' is the information to be mapped and originated in one of the data sources 110, and the Data_Address is the record of the information within a bucket.

The number of buckets is predefined but can be scalable depending on the number of most significant bits (MSB) of data utilized for the mapping. For example, a number of 256 buckets can be expanded to 65536 buckets by considering two most significant bytes. In an embodiment, the content of any two buckets is mutually exclusive. That is, the intersection of any two buckets would be null.

According to the disclosed embodiments, the mapping is to a bucket and a (record) within a bucket. To this end, two different hash functions may be utilized: a first hash function to map the dataset to a bucket and a second hash function to map the hash value computed by the first function to a record within the bucket. In an example implementation, the first hash function is: a 128-bit hash generating 16-byte hash value that is sufficient to uniquely identify terrabytes of data to a particular bucket. In that example implementation, the second hash function is a 32-bit function used to map the dataset to a record within each bucket. It should be noted that, depending on the number of buckets, the size of the entire data in the single bucket should be about 1/N, where N is an integer designating the number of buckets. As noted above, the number of buckets 'N' can be predefined. It should be further noted that the first and second hash functions do not change and, therefore, the hash functions apply to all datasets regardless of their original data source 110.

In an embodiment, raw data approximation is utilized to approximate the number of distinct elements in the data to be hashed. The approximation can be performed using techniques such as, but not limited to, HyperLogLog (HLL), Bit Sets, Bit Maps, and the like.

Figure 2:
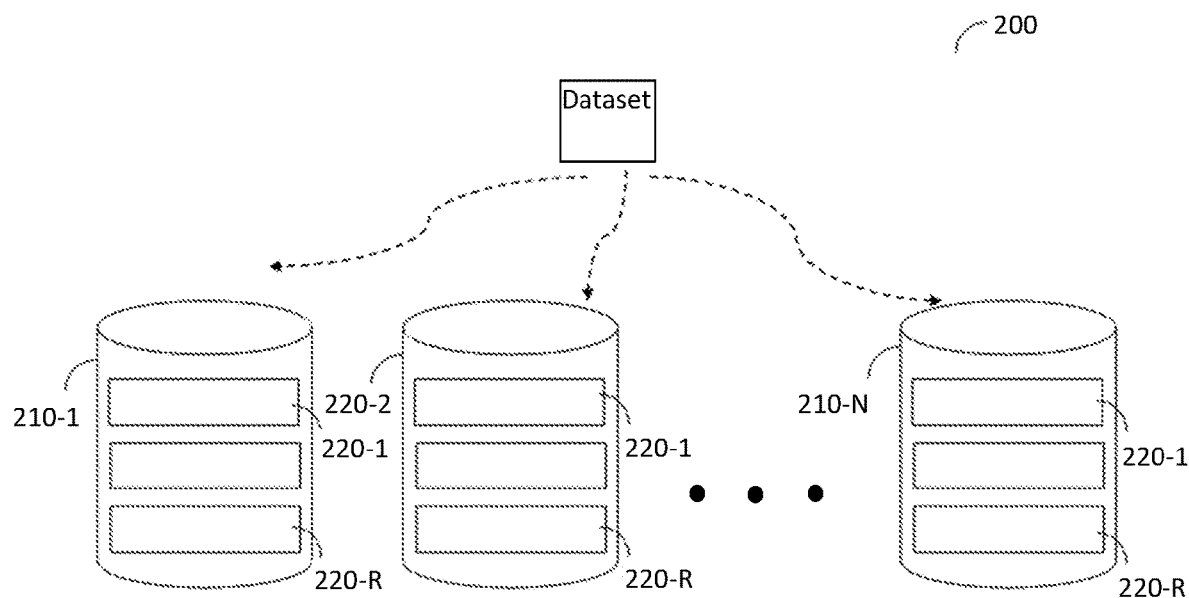
FIG. 2 is an example diagram illustrating hash bucketing according to an embodiment.

FIG. 2 is an example diagram 200 illustrating the hash bucketing according to an embodiment. The diagram 200 depicts a number of N buckets 210-1 through 210-N (hereinafter referred to individually as a bucket 210 and collectively as buckets 210 for simplicity). Each bucket includes a number of records 220-1 through 220-R (hereinafter referred to individually as a record 220 and collectively as records 220 for simplicity, and R is an integer number).

Each record 220 maintains metadata allowing for mapping the location (record) of the hashed data in the bucket to the original location in one of the data sources 110 (FIG. 1). It should be noted that buckets, records, and metadata are saved in the data store 140 and logically can be maintained, for example, in a single table.

Figure 3:
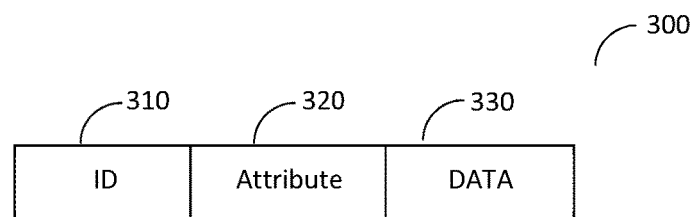
FIG. 3 is an example diagram illustrating a metadata structure according to an embodiment.

FIG. 3 is an example diagram illustrating a metadata structure 300 according to an embodiment. The metadata structure 300 includes the following columns (or fields): identifier (ID) 310, attributes 320, and DATA 330.

The ID column 310 holds a reference to a location of the original dataset in the one or more data sources. The format of the ID column 310 includes a bucket identifier (ID) and a URL. In an example configuration, the URL may be associated with URI of the given data entry in an origin data source. For example, the URI may designate a fully qualified path to a specific column, including database, table and column names, when data from relational databases is recorded, directory and file from file system, or hyperlink to web page, streaming data, and so on.

The attributes column 320 holds all attributes of the given dataset. The list of attributes may include, but is not limited to, column metadata (e.g., column name, column type, column type name, and so on), references to other columns, statistics, the total count of elements in a dataset, counts of distinct value, and so on. It should be noted that the list of attributes is not fixed and depends on the type of the original data. For example, attributes of data storage in a database may be different than attributes of documents or streaming data.

The DATA column 330 is configured to maintain approximated dataset values, for example, HLL values, Bit Map values, or both. In some implementations, the actual raw data is saved instead of the approximated presentations.

In an embodiment, all records 220 maintaining the metadata are lexicographically sorted in order based on ID columns' values. An example set of records maintaining metadata datasets stored in relational databases is provided in Table 1.

TABLE 1

| ID | Attribute | DATA |
| --- | --- | --- |
| Bucket#.DB1.TB1.COL1 | Att1, Att2, Att3 | HLL/, BitSet |
| Bucket#.DB1.TB1.COL2 | Att11, Att12, Att13 | HLL, BitSet |
| Bucket#.DB1.TB2.COL1 | Att21, Att22, Att23 | HLL, BitSet |
| Bucket#.DB1.TB2.COL2 | Att31, Att32, Att33 | HLL, BitSet |
| Bucket#.DB1.TB2.COL3 | Att41, Att42, Att43 | HLL, BitSet |
| Bucket#.DB1.TB3.COL1 | Att51, Att52, Att53 | HLL, BitSet |
| Bucket#.DB1.TB3.COL2 | Att61, Att62, Att63 | HLL, BitSet |

The values in each metadata is typically different. It should be appreciated that the metadata and record structures as disclosed herein allow constant access time to locate the data in a bucket. The access time may be between an order of 1, O(1), and an order of R, O(R), where R is the number of records in a bucket. Because an ID column provides a direct fully qualified path (or pointer) to an original dataset stored in one of the data sources (110, FIG. 1), the access time to the original data is also constant.

In an embodiment, the bits of the dataset are sliced (i.e., Bit slicing operation) before applying the hash function. This is performed in order to accelerate the processing time and to save on computational resources such as memory and CPU. In an embodiment, the entire dataset is sliced into multiple sub-sets. Each sub-set is responsible only for a limited range of the hash values produced by the hash function. Specifically, the hash function is computed over each sub-set. For example, for a 32-bit hash function, 1024 sub-sets are created. Further, the hash values computed over the sub-sets are saved in partitions. The number of partitions is significantly less than the number of sub-sets. For example, the number of partitions may be 16. It should be noted that the number of sub-sets and partitions may be any number that it is a power of 2.

The distribution to the partitions is based on the MSB of the hash's values. As a non-limiting example, the hash value is directed to partition #0 if the MSB bits (e.g., 4 first bits) if the first four bits of the hash value hash value are '0000', the hash value is directed to partition #1 if the first 4 bits of the hash value are '0001', and so on.

In certain embodiments, arithmetic operations are performed on the sliced sub-sets, their respective hash values, or both. Such operations may include cardinality, concatenation, intersection, union, match, and the like.

Figure 4:
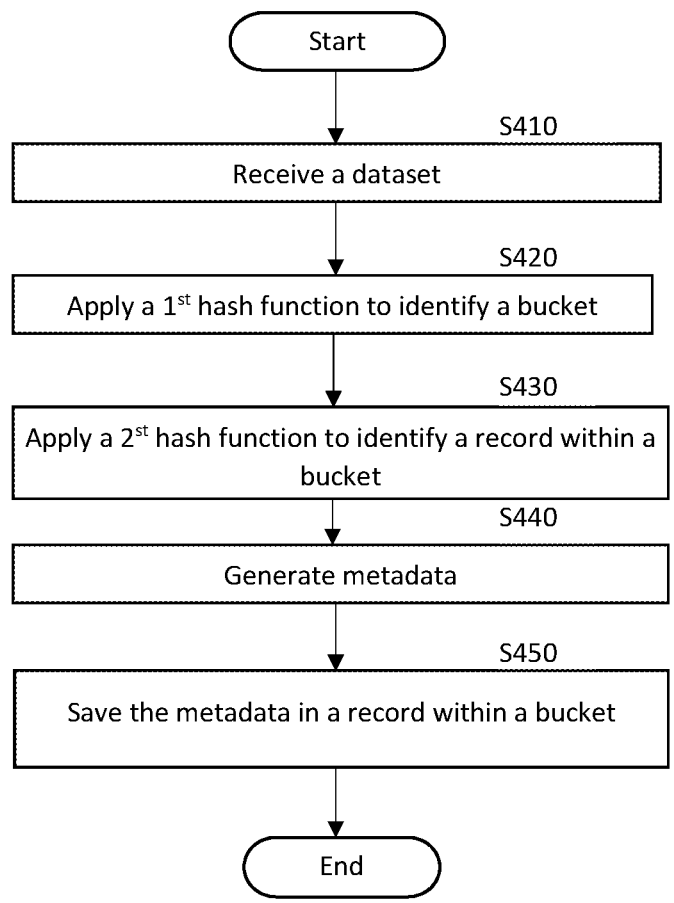
FIG. 4 is an example flowchart illustrating a method for performing a hash bucketing process according to an embodiment.

FIG. 4 is an example flowchart 400 of a method for performing a hash bucketing process on data in motion according to an embodiment. The process is performed in real-time. At S410, an input dataset is received. The input dataset may be read, retrieved, or otherwise received from any data source (e.g., one or more of the data sources 110, FIG. 1). The input dataset may include, for example, a file, a portion of a file, a database table, column(s) of a database table, data entries, data objects (e.g., images, video files, etc.), and so on.

At S420, a first hash function is applied to map the dataset to a bucket. In an example implementation, the first hash function is a 128-bit hash function.

At S430, a second hash function is applied on the hash value computed by the first function to identify a record within the bucket determined at S420. In an example implementation, the second hash function is a 32-bit function used to identify data within each bucket. It should be further noted that, in certain embodiments, one hash function can be utilized to map the dataset to the respective record in a determined bucket.

In some embodiments, the dataset is sliced before applying the second hash function. As noted above, the dataset is sliced into multiple sub-sets. Each sub-set is responsible only for a limited range of the hash value produced by the hash function.

In an embodiment, before applying the hash function, the dataset is sliced into a predefined number of sub-sets, and the second hash function is computed over each sub-set. The hash values computed over the sub-sets are saved in partitions based on the respective hash's values.

At S440, the information about the dataset (metadata) is generated based on the dataset. The metadata is typically associated with each dataset and includes an address (e.g., URL or URI) of the source of the data set, a format of the dataset (e.g., text, doc, pdf, sound, video, jpeg, and so on), the type of software that produced this dataset (e.g., a word processor, a relation database, a data stream, and so on). In some cases, there is a magic byte at the beginning of most files that helps to identify type of data in the dataset. The tabular dataset there is a structure: a table name, a columns and column names, types, size and so on.

In an embodiment, S440 includes extracting the metadata of the input dataset and determining the contents of the metadata's structure (columns). Such columns include an ID, an attribute, and a DATA column. Examples and definitions of the metadata's columns are discussed above.

At S450, the generated metadata is stored in a respective record in the determined bucket. As noted above, the records within each bucket may be sorted in order.

In some embodiments, the hash bucketing process discussed herein can be utilized for efficient and fast tagging of information including, but not limited to, sensitive information. As noted above, sensitive information is any information that is protected against unwarranted disclosure.

The tagging of sensitive information (or any other type of information) is performed using a hash bucketing process as described above. In an embodiment, a knowledge repository (e.g., the knowledge repository 135, FIG. 1) includes metadata of information classified, for example, as sensitive information. The tagging process may include hashing an input dataset and matching the hash value against the contents of the repository knowledge. If a match is found, the dataset may be tagged as sensitive information. It should be noted that the metadata is generated for the input dataset. In an example implementation, a sensitive information tag may be saved as part of the metadata's attributes. The dataset to be matched is configured to be, data in motion. It should be further noted that the knowledge repository holds metadata of sensitive information (or any other information). The metadata's generation is created using the hash bucketing process discussed herein.

In certain embodiments, the matching against the contents of the knowledge repository may be performed using techniques including, but not limited to, natural language processing (NLP), pattern matching, machine learning, and the like.

The processing of data in motion is performed in real-time. The computing environment in which the data sources reside are distributed in nature, implementing data stream processing. In order to support the processing of data in motion in such environments regardless of the type of the data source and the computing environment, a modular processing architecture is disclosed herein.

The modular processing architecture is realized through execution of commands defined herein. In an example embodiment, a command is defined using the following interface:

Command<I, O, P, S> where 'I' is generic type that represents an input for command; 'O' is a generic type that represents an output of the command; 'P' is the command's parameters; and 'S' is the persistence service that provides management of intermediate data between sequential calls of the command.

The input and output can be presented as a reference to an external data source. In an embodiment, execution of a command is through a respective instance from the runtime environment. The runtime environment may assign the appropriate commands' attributes. Any command, defined herein, is stateless, and as such, is suitable for distributed computing. However, commands cannot run as standalone programs or applications.

Specifically, commands are stateless instances and therefore are dependent on external data sources and parameters. Parameters and references (i.e., pointers to external data sources) to the persistence service are usually provided explicitly. Input data may be sent to the command explicitly as a data collection or by reference as a fully qualified path to the external data source.

The command may output the computing results as a data collection or use an external dataset to save the results. The command also can serve as a proxy. Commands serving as proxies can redirect requests to external computational frameworks, such as Apache Flink, Spark, Storm, and the like.

According to some embodiments, commands in the pipelines may include, for example: source commands; sink commands; and processing commands.

Following are some examples for the source commands: ingesting data into streaming frameworks (e.g., Apache Kafka®); supporting local file systems (e.g., sequential reading, scanning and filtering); supporting HBase with a local file system as a data store (querying, scanning and filtering data); and supporting a graph database (querying and traversing graph database).

Following are some examples for data transformation commands: search commands: indexing and mapping source data; search and query data; custom filtering and aggregations; data sampling and basic statistics: generation of samples from local file systems; calculations of statistical values (e.g., mean, median, average, standard deviation, etc.); statistical models; machine learning processing; and proxy commands to execute agents and external computational frameworks.

Following are some examples of sink commands: writing data into a local file system; writing/dumping data into HDFS/HBase/Cassandra; and writing data into graph database as graph's nodes and edges.

Pipeline commands can be executed in two modes: sequentially and asynchronously. Commands are executed sequentially when the next command in the pipeline is executed only after the previous command's execution ends. Commands are executed asynchronously when all commands, in the pipeline, can be executed simultaneously, exchange data with each other using an asynchronous messaging layer, and perform processing as soon as an input object provides the necessary data. The messaging layer may be any system that uses buffer to allow processing at later time. This is in contrast to the synchronous messaging system, when processing cannot be postponed and should be performed at the delivery time or loss of message(s).

In an embodiment, the commands communicate with external systems and/or frameworks and use, when communicating amongst themselves, standardized input and output objects. Structurally, both input and output are the same, thus no additional processing is needed for outputs communicated between commands. Pipeline commands can accept a list of references to other commands as parameters in the input object and then execute those commands.

Figure 5:
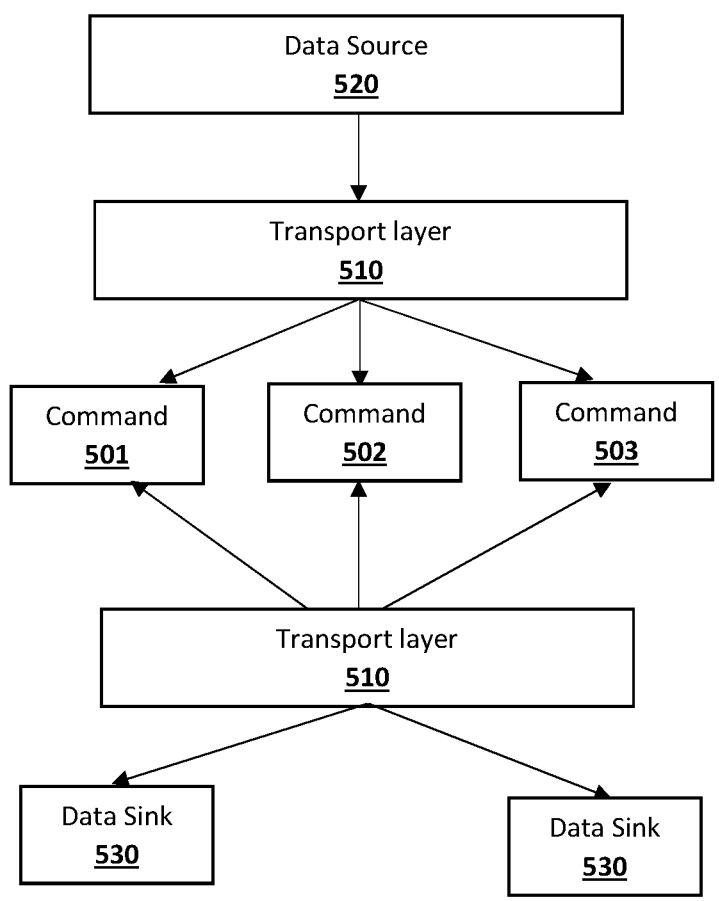
FIG. 5 is an example diagram illustrating continuous streaming processing using the commands disclosed according to the various embodiments.

FIG. 5 shows an example diagram 500 illustrating continuous processing of data-in-motion streams using the commands and a graph execution engine according to the various embodiments. The processing, as demonstrated in FIG. 5, is a command flow performing a pattern mining command (501), a domain profiling command (502), and a relationship profiling command (503) in parallel. A transport layer 510 transports data from the data source 520. The commands 501, 502 and 503 send the processing results to data sinks 530 through a transport layer 510.

In an example implementation, the data source 520 may be, for example, an Oracle® database and the data sinks 530 may be, for example, Cassandra® and Graph DBs. The transport layer 510 may be realized using, for example, Cassandra Kafka®. Kafka® is an open-source platform designed to provide a unified, high-throughput, low-latency platform for handling real-time data feeds.

In an embodiment, to support parallel execution of commands, a graph execution engine is implemented. A graph execution engine is required in distributed systems when data is distributed across computing nodes.

Figure 8:
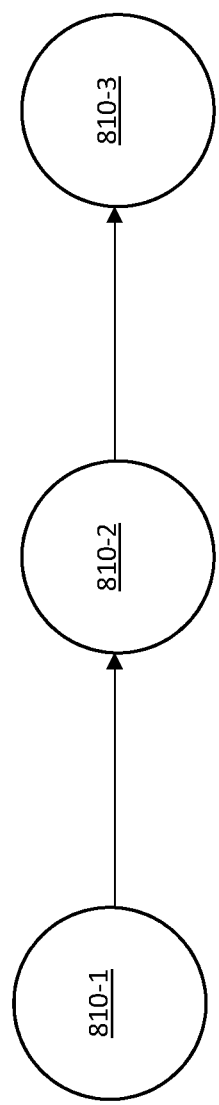
FIG. 8 is an example execution graph.

According to an embodiment, a novel approach for a graph execution engine is disclosed. In contrast to existing graph execution techniques, the disclosed graph execution engine does not use a direct traversal over graph nodes. Instead, the graph execution engine is configured to use queues defining an execution status for each execution graph node (or simply "node"). A node is a command, while an execution graph is the order to the command invocation. In an embodiment, a node describes the environment, input, and output of a command. FIG. 8 illustrates an example execution graph 800 with 3 nodes 810-1, 810-2, and 810-3, each representing the following 3 commands:

810-1: ingestDataFromDb (1);
810-2: calculateBitSetAndHII (2); and
810-3: saveResultInHbase (3).

The order to execution would be according to the order of the nodes: that is, 810-1, 810-2, and then 810-3.

In an embodiment, each queue is coded (e.g., color coded) to designate a different phase of the processing. For example, the queues may be color coded with: Green, White, Blue, Grey, Red, and Black. Each queue may be realized as a first in first out (FIFO) queue. The queues hold references (pointers) to the nodes in the graph that are in corresponding processing states.

In an example implementation, the Green queue serves as a source, the Black queue serves as a sink, and the Grey queue represents an "in-process" state. White, Blue, and Red queues represent different processing states of the nodes between a start and end status. The start and end statuses are represented by Green and Black queues, respectively.

Execution graph nodes placed in the queues may be implicitly related. Each node may hold contexts of "in-node" and "out-node" that can be in the same queue or different queues. Such nodes are transferred from one queue to another based on their status and the results of the processing of a current node. An out-node is a node having data from a current node as a source in its edges.

A White queue may move out-nodes of a current node depending on the resulting state either to a Black queue or a Red queue. A Blue queue is configured to process nodes from a Red queue and moves a node either to a Black queue or a Red queue depending on the resulting state. The Red queue processes and moves unprocessed in-nodes of a current node to a Blue queue. In one configuration, the processing within each node may be asynchronous.

Figure 6:
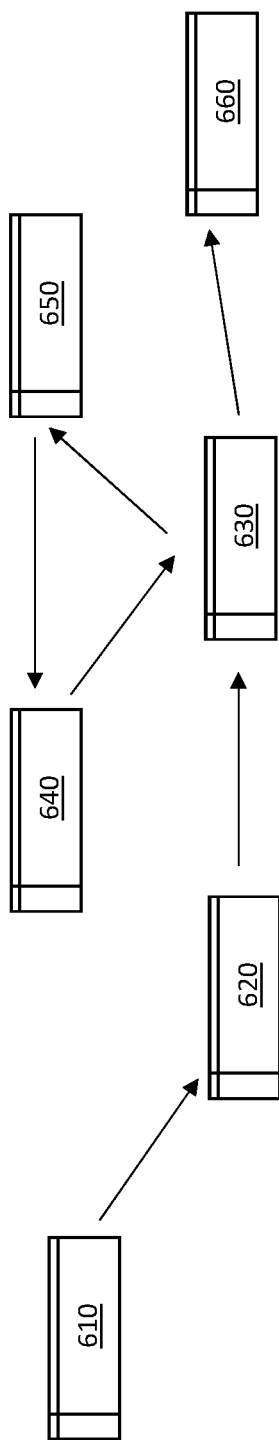
FIG. 6 is an illustration demonstrating graph execution according to an embodiment.

As demonstrated in FIG. 6, the graph execution disclosed herein attempts to move each node in the execution graph from a Green queue 610 to a Black queue 660.

The process, as performed by the graph execution engine, places all nodes in the Green queue 610. Then, all start nodes in the graph are placed in a White queue 620 (shown) or a Blue queue 640 (not shown). All nodes in the White queue 620 are waiting to be processed. A node ready to be processed is moved to a Gray queue 630 to start the processing of the node. As the queue is a FIFO queue, the first node in the queue is transferred to processing, i.e., to the Gray queue 630. When processing of a node is completed, the node is transferred to a Black queue 660. At the same time, out-nodes of the current node are moved from the Green queue 610 to the White queue 620.

When processing of nodes in the White queue 620 is completed, processing of nodes in the Red queue 650 is performed. First, all in-nodes in the Green queue 610 related to each node in the Red queue 650 are detected. Such nodes are transferred to the Blue queue 640. Nodes in the Blue queue 640 are processed in the same fashion as nodes in the White queue 620. Then, nodes can be moved from the Red queue 650 to the Black queue 660.

It should be appreciated that the graph execution engine can utilize other types of data structures and are not limited to color coded queues. For example, a state machine can be utilized instead of the color-coded queues discussed above. It should be further appreciated that the graph execution engine can be realized as a hardware logic hardware logic component. The graph execution engine 130 may be part of the system 130 or a standalone element. Examples for a hardware logic component are provided.

FIG. 7 shows an example block diagram of the system 130 implemented according to an embodiment. The system 130 includes a processing circuitry 710 coupled to a memory 715, a storage 720, and a network interface 730. In an embodiment, the components of the system 130 may be communicatively connected via a bus 740.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 715 may be volatile (e.g., RAM, etc.), non-volatile (e.g., ROM, flash memory, etc.), or a combination thereof. In one configuration, computer readable instructions to implement one or more embodiments disclosed herein may be stored in the storage 720.

In another embodiment, the memory 715 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 610 to perform the various processes described herein. Specifically, the instructions, when executed, cause the processing circuitry 710 to perform the hash bucketing process as discussed hereinabove. The processing circuitry 710 is also configured to execute the Commands and graph execution engine.

The storage 720 may be magnetic storage, optical storage, and the like, and may be realized, for example, as flash memory or other memory technology, CD-ROM, Digital Versatile Disks (DVDs), or any other medium which can be used to store the desired information.

The network interface 730 allows the system 130 to communicate with the at least one various data sources (FIG. 1, 110).

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer implemented method for continuous processing of data-in-motion streams residing in distributed data sources, comprising:
   receiving a plurality of data-in-motion streams from a plurality of distributed data sources;
   processing each of the plurality of data-in-motion streams using a plurality commands, the plurality commands being executed in parallel using a graph execution engine;
   transporting, through a transport layer, each of the plurality of data-in-motion streams using the plurality commands to at least one data sink; and
   associating coded queues with nodes in an execution graph processed by the graph execution engine, wherein each node is associated with a command of the plurality of commands, and wherein the execution graph determines an order of execution of the plurality of commands,
   wherein the graph execution engine is configured to process each of the plurality of commands through the associated coded queues,
   wherein each coded queue determines a different status in processing states of a command,
   wherein each coded queue maintains pointers to the nodes in the execution graph, and
   wherein each of the plurality of commands is defined using the following interface:
   Command <I, O, P, S>
   wherein, 'I' is a generic type representing an input for command; 'O' is a generic type representing an output of the command; 'P' includes command's parameters; and 'S' is a persistence service providing management of intermediate data between sequential calls of the command.

2. The computer implemented method of claim 1, wherein each command is a stateless instance and depends on the plurality of data sources.

3. The computer implemented method of claim 1, wherein the plurality of commands are executed in a pipeline manner.

4. The computer implemented method of claim 3, wherein a pipelined command is sequentially executed.

5. The computer implemented method of claim 3, wherein a pipelined command is asynchronously executed.

6. The computer implemented method of claim 5, further comprising:
   exchanging, using a messaging layer, data among commands that are asynchronously executed.

7. The computer implemented method of claim 1, wherein the graph execution engine is a hardware logic component.

8. A non-transitory computer readable medium having stored thereon instructions for causing a processing circuitry to execute a process for continuous processing of data-in-motion streams reside in distributed data sources, comprising:
   receiving a plurality of data-in-motion streams from a plurality of distributed data sources;
   processing each of the plurality of data-in-motion streams using a plurality commands, the plurality commands being executed in parallel using a graph execution engine; and
   transporting, through a transport layer, each of the plurality of data-in-motion streams using the plurality commands to at least one data sink; and
   associating coded queues with nodes in an execution graph processed by the graph execution engine, wherein each node is associated with a command of the plurality of commands, and wherein the execution graph determines an order of execution of the plurality of commands,
   wherein the graph execution engine is configured to process each of the plurality of commands through the associated coded queues,
   wherein each coded queue determines a different status in processing states of a command,
   wherein each coded queue maintains pointers to the nodes in the execution graph, and
   wherein each of the plurality of commands is defined using the following interface:
   Command <I, O, P, S>
   wherein, 'I' is a generic type representing an input for command; 'O' is a generic type representing an output of the command; 'P' includes command's parameters; and S is a persistence service providing management of intermediate data between sequential calls of the command.

9. A system for continuous processing of data-in-motion streams residing in distributed data sources, comprising:
   a processing circuitry; and
   a memory, the memory containing instructions that, when executed by the processing circuitry, configure the system to:
   receive a plurality of data-in-motion streams from a plurality of distributed data sources;
   process each of the plurality of data-in-motion streams using a plurality commands, the plurality commands being executed in parallel using a graph execution engine; and
   transport, through a transport layer, each of the plurality of data-in-motion streams using the plurality commands to at least one data sink; and
   associate coded queues with nodes in an execution graph processed by the graph execution engine, wherein each node is associated with a command of the plurality of commands, and wherein the execution graph determines an order of execution of the plurality of commands,
   wherein the graph execution engine is configured to process each of the plurality of commands through the associated coded queues, wherein each coded queue determines a different status in processing states of a command, wherein each coded queue maintains pointers to the nodes in the execution graph, and wherein each of the plurality of commands is defined using the following interface:

Command <I, O, P, S> wherein, 'I' is a generic type representing an input for command; 'O' is a generic type representing an output of the command; 'P' includes command's parameters; and 'S' is a persistence service providing management of intermediate data between sequential calls of the command.

10. The system of claim 9, wherein each command is a stateless instance and depends on the plurality of data sources.

11. The system of claim 9, wherein the plurality of commands is executed in a pipeline manner.

12. The system of claim 11, wherein a pipelined command of is sequentially executed.

13. The system of claim 11, wherein a pipelined command is asynchronously executed.

14. The system of claim 13, wherein the system is further configured to:

exchange, using a messaging layer, data among commands that are asynchronously executed.

15. The system of claim 9, wherein the graph execution engine is a hardware logic component.

* * * * *